United States Patent
Shiozaki et al.

(12) United States Patent (10) Patent No.: US 7,807,942 B2
Shiozaki et al. (45) Date of Patent: Oct. 5, 2010

(54) LASER PROCESSING METHOD AND LASER PROCESSING APPARATUS

(75) Inventors: Manabu Shiozaki, Osaka (JP); Keiji Fuse, Osaka (JP); Kenichi Watatani, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 1074 days.

(21) Appl. No.: 11/260,198

(22) Filed: Oct. 28, 2005

(65) Prior Publication Data

US 2006/0109874 A1 May 25, 2006

(30) Foreign Application Priority Data

Nov. 22, 2004 (JP) .............................. 2004-336944

(51) Int. Cl.
   *B23K 26/38* (2006.01)
(52) U.S. Cl. ..................... 219/121.68; 219/121.69; 219/121.7; 219/121.71
(58) Field of Classification Search ................................. 219/121.61–121.75
   See application file for complete search history.

(56) References Cited

U.S. PATENT DOCUMENTS

| | | | | |
|---|---|---|---|---|
| 3,622,790 A | * | 11/1971 | Zavodny, Alfred T. | ...... 398/140 |
| 3,898,585 A | * | 8/1975 | Heidrich et al. | ................ 372/96 |
| 4,198,701 A | * | 4/1980 | Reddersen et al. | .......... 365/127 |
| 4,355,869 A | * | 10/1982 | Yao | .............................. 359/305 |
| 4,561,086 A | * | 12/1985 | Geyer | .......................... 369/100 |
| 5,349,155 A | * | 9/1994 | Yamagishi et al. | ..... 219/121.71 |
| 5,422,746 A | * | 6/1995 | Aharoni et al. | ................ 359/16 |
| 5,446,588 A | * | 8/1995 | Missig et al. | ................ 359/565 |
| 5,501,944 A | * | 3/1996 | Hill et al. | ..................... 430/321 |
| 5,615,029 A | * | 3/1997 | Moddel et al. | ................. 349/84 |
| 5,624,436 A | * | 4/1997 | Nakamura et al. | ............. 606/12 |
| 6,094,286 A | * | 7/2000 | Kato | ......................... 359/206.1 |
| 6,433,303 B1 | * | 8/2002 | Liu et al. | .................. 219/121.7 |
| 6,552,301 B2 | * | 4/2003 | Herman et al. | ......... 219/121.71 |
| 6,555,781 B2 | * | 4/2003 | Ngoi et al. | ............. 219/121.67 |
| 6,642,480 B2 | * | 11/2003 | Amako et al. | .......... 219/121.75 |

(Continued)

FOREIGN PATENT DOCUMENTS

DE 197 36 110 A1 3/1999

(Continued)

*Primary Examiner*—Samuel M Heinrich
(74) *Attorney, Agent, or Firm*—McDermott Will & Emery LLP

(57) ABSTRACT

Ultrashort pulse laser processing bores, welds or cuts objects (work pieces) by converging ultrashort laser pulses by a lens on the objects (work pieces) positioned at the focus and heating small spots or narrow lines on the objects (work pieces). Shortage of a focal depth of the lens prevents the ultrashort pulse laser processing from positioning the object (a work piece) and forming a deep, constant-diameter cylindrical hole. Z-parameter is defined to be $Z=2fc\Delta t/\Delta i^2$, where $\Delta t$ is a FWHM pulse width of the ultrashort pulse laser, $\Delta i$ is a FWHM beam diameter of the ultrashort pulse, f is a focal length of the lens and c is the light velocity in vacuum. Selection of an optical system including a diffraction-type lens which gives the Z-parameter less than 1 ($Z<1$) prolongs the focal depth. Expansion of the focal depth facilitates the positioning of objects (work pieces) and enables the ultrashort pulse laser apparatus to bore a deep, constant-diameter cylindrical hole.

17 Claims, 4 Drawing Sheets

Beam shielding in hole-boring processing diffractive lens         object

U.S. PATENT DOCUMENTS

| | | | |
|---|---|---|---|
| 6,946,620 B2* | 9/2005 | Amako et al. | 219/121.75 |
| 7,303,977 B2* | 12/2007 | Voronov et al. | 438/463 |
| 7,551,537 B2* | 6/2009 | Tamada | 369/100 |
| 2003/0052102 A1 | 3/2003 | Amako et al. | |
| 2003/0205564 A1 | 11/2003 | Amako et al. | |
| 2004/0017430 A1 | 1/2004 | Miyuzama et al. | |
| 2005/0000952 A1* | 1/2005 | Harter | 219/121.68 |
| 2005/0219644 A1* | 10/2005 | Ehara et al. | 358/474 |

FOREIGN PATENT DOCUMENTS

| | | |
|---|---|---|
| JP | 2001-138083 A | 5/2001 |
| JP | 2003-305585 A | 10/2003 |
| WO | WO 2005/016589 A1 | 2/2005 |

* cited by examiner 301A refractive surface
301B diffractive surface

Convergence of laser beam

Sections of lenses a —— refractive lens
b —— Fresnel lens
c —— binary lens

Reason why a diffractive lens prolongs the focal depth refractive lens     diffractive lens Relation between Z-parameter and magnification rate of focal depth Beam shielding in hole-boring processing

LASER PROCESSING METHOD AND LASER PROCESSING APPARATUS

BACKGROUND OF THE INVENTION

1. Field of the Invention

This invention relates to a laser processing method and an apparatus of hole-boring, cutting or welding by irradiating objects (work pieces) with high power ultrashort pulse laser beams. Ultrashort pulse laser processing, which converges an ultrashort laser pulse by a lens and irradiates an object (a work piece) with the converged pulse, has an advantage of neither heating nor degenerating surrounding parts since heated regions are narrowly localized and ultrashort duration time gives no time of heat diffusion to the surrounding parts. The ultrashort pulse laser processing is a momentary, adiabatic processing. The ultrashort laser pulse processing is suitable for the processing of resins, glasses, quartz, sapphire, semiconductors, and so on.

This application claims the priority of Japanese Patent Application No. 2004-336944 filed on Nov. 22, 2004, which is incorporated herein by reference.

2. Description of Related Art

Japanese Patent Laying Open No. 2003-305585 "Laser processing and apparatus" pointed out a problem of the occurrence of color aberration caused by wavelength dispersion when an ultrashort pulse was converged by a refractive lens. Since the pulse width is very short, the wavelength does not take a constant value but fluctuates. Each lens material has an intrinsic refractive index dispersion ($dn/d\lambda < 0$). The negative refractive index dispersion allocates shorter focal lengths to shorter wavelength rays and longer focal lengths to longer wavelength rays. Dispersion of the focal lengths degenerates convergence of the laser beam.

Japanese Patent Laying Open No. 2003-305585 proposed a hybrid lens having a refractive front surface and a diffractive rear surface as a lens of the ultrashort pulse laser processing. Diffractive lenses allocate longer focal lengths to shorter wavelength rays and shorter focal lengths to longer wavelength rays against refractive lenses. The function of a diffractive lens is contrary to the function of a refractive lens with regard to color aberration. Japanese Patent Laying Open No. 2003-305585 proposed a method of obtaining 0 color aberration by compensating the aberration induced by the refractive lens with the counter aberration caused by the diffraction lens. FIG. 1 shows a figure described in Japanese Patent Laying Open No. 2003-305585. The front surface (301A) is a refractive plane and the rear surface (301B) is a zigzag diffractive plane. The diffraction function cancels the color aberration caused by the refractive function in the optics in FIG. 1.

SUMMARY OF THE INVENTION

Instantaneous processing requires laser beams to raise power density. Conventional laser beam processing makes use of a converging lens for concentrating beam power at a narrow region. However various kinds of aberration accompany refractive-type lenses. The aberration prevents the lenses from converging the laser beam to a desired narrow region. In the case of continual laser beam processing using a refractive-type lens, the aberration of refractive lenses is a problem. There are several kinds of aberration in refractive-type lenses. Pulse laser, in particular, ultrashort pulse laser processing causes new aberration owing to the narrowness of a pulse. This aberration originates not from lenses but from ultrashortness of a pulse. The new aberration is that the wavelength is no more a single one and has a definite range. An ultrashort pulse laser beam loses monochromacity. The pulse laser beam including a definite continual range of wavelengths may be called a "multiwavelength" beam. Color aberration is caused in an optical system of converging ultrashort laser pulses by a refractive type lens due to wavelength dispersion ($dn/d\lambda$) of the lens material. Japanese Patent Laying Open No. 2003-305585 proposed an idea of cancelling the color aberration appearing in the pulse laser system using a refractive lens.

It is important to raise horizontal resolution in an xy-plane, which is orthogonal to the beam line (z-axis) in the laser processing which converges a laser beam at a narrow region. Sometimes laser beams are used for cutting, annealing or welding a part having a long depth (z-direction) of an object (a work piece). The depth (z-) direction processing requires a deep (long) focal depth. A shallow focal depth of a beam allows a small (z-direction) distance error to induce large dispersion of the beam power and invite shortage of power density at an object (a work piece) spot. A deep (long) local depth is important in the laser processing as well as a fine horizontal resolution. This invention aims to prolong the focal length.

Semiconductor industries have utilized photolithography. Photolithgraphy adopts size-reduction optical systems. Large aperture lenses are employed in photolithography. Resolution is given by $k_1 \lambda/(NA)$, where $k_1$ is a constant determine by the lens shape, NA is a numerical aperture and $\lambda$ is a wavelength of incident light. A focal depth is given by $k_2 \lambda/(NA)^2$. Photolithgraphy, which relies upon an size-reduction optical system, employs a large aperture lens (a wide lens) having a large NA for raising resolution. A large NA shortens the focal depth $k_2 \lambda/(NA)^2$. A shallow focal depth is undesirable, because light power does not penetrate into inner parts of a photoresist. Photolithography has tried to enlarge the focal depth for a large NA lens by enhancing $k_2$. Resolution and focal depth contradict each other in photolithography.

Laser beam processing, which treats metals, ceramics or glasses with high power laser beams, requires not so high resolution as semiconductor photolithography. Laser beam processing requires a focal depth deeper than photolithography. A deep (long) focal depth is essential for laser beam processing to perforate holes piercing an object (a work piece) at a stroke.

Conventional laser processing apparatus does not employ a size-reducing optical system. A hole is bored on even a rigid object (a work piece), at length, by irradiating the object (a work piece) for enough time with a narrow continual laser beam. The focal depth has been insignificant for continual laser beam processings.

However, pulse laser processing, which bores a hole by a single pulse or a few pulses, requires a deep focal depth of lens-converged beams. In order to form a deep, constant-diameter hole with precision, the hole should be bored at a stroke by a single giant pulse. A deep focal depth is essential for the single pulse processing.

The refractive-type lenses employed in photolithography have the definite expression $k_2 \lambda/(NA)^2$ of the focal depth. On the contrary, no exact expression of the focal depth of the ultrashort pulse laser processing has been known. No attention has been paid to the study of the focal depth of the ultrashort pulse lasers.

The purpose of the present invention is to provide a method and an apparatus for prolonging the focal depth of the ultrashort pulse laser processing.

The present invention deepens the focal depth of the lens in the ultrashort pulse laser processing by converging pulse laser beams by a diffractive-type lens on a condition of keeping the Z-parameter $Zp = 2f_0 c \Delta t / \Delta i^2$ less than 1 ($Zp \leq 1$). Here $f_0$ is a focal length of the diffraction-type lens, c is a light velocity in vacuum, $\Delta t$ is a time pulse width FWHM (Full Width at Half Maximum), and $\Delta i$ is an incident beam diameter FWHM.

An ordinary smoothly curved-surface lens relying upon refraction is called a refractive-type lens or a refractive lens in short for discerning other types of lenses. The refractive-type lens is an excellent lens having advantages of freedom from diffraction, little aberration, high efficiency of refraction and good convergence. However, the conventional refractive lens has a shallow focal thickness denoted by the equation $k_2\lambda/(NA)^2$. The poor foal depth is a problem of refractive lenses. A decrease of the numerical aperture NA will enlarge the focal depth. But the resolution will be degenerated by the decrement of NA. It is difficult to raise the shape factor $k_2$ by contriving the shape of a refractive lens. There is poor room for deepening the focal depth of refractive-type lenses at the cost of resolution.

The present invention employs a diffractive-type lens for accomplishing a deep focal depth instead of the conventional refractive-type lens. The diffractive lens has weak points in aberration, efficiency and cost. The Inventors have noticed that diffraction lens would have a probability of raising the focal depth performance. Properties of conventional refraction lenses are now briefly described for clarifying the properties of diffraction lenses. Functions of the refractive lenses are explained within the scope of thin lens approximation. The curvature radius of a thin lens is denoted by R. A thickness variation d(r) of a thin spherical lens is described in a second order function $$d(r)=d_0-r^2/2R, \quad (1)$$

where r is a radial coordinate measured from the center and $d_0$ is a thickness at the center of the lens. The thickness decreases as r increases. When the lens has both spherical surfaces, the curvature 1/R is allocated to both surfaces with $1/R_1$ and $1/R_2$ as $1/R=1/R_1+1/R_2$. The focal length f is determined by $f^{-1}=(n-1)(1/R_1+1/R_2)$.

Here the lens is assumed to be a flat-convex lens for simplicity, since the purpose is to explain the function of a diffraction lens in contrast to a refraction lens. A flat-convex lens can easily be revised by replacing 1/R to $1/R_1+1/R_2$ for curvature radii of both surfaces.

The tangential slant of a lens part at radius r to the base plane is Y=r/R. The total bending angle of a beam in a prism has a top angle α is (n−1)α. When a ray goes into the lens at radius r, the ray bends by a total angle of (n−1)r/R. Parallel incidence rays are converged at a focus f. The bending angle (n−1)r/R should be equal to r/f. Namely r/f=(n−1)r/R. Under the assumption of the thin lens, the equality holds for all radius coordinates r. A unique value is determined for a focal length f. Thus the focal length f of a refractive type lens is given by $$1/f=(n-1)/R. \quad (2)$$

When the lens is a convex-convex lens, 1/R should be replaced by $1/R_1+1/R_2$.

Eq. 2 teaches us that the focal length f of a refractive lens is determined by the curvature radius R and the refractive index n. A change of wavelengths λ has an influence upon the focal length f via the wavelength dispersion (dn/dλ). The wavelength dispersion (dn/dλ), which depends upon the lens materials, is very small. The change of the focal length induced by a change of wavelengths is very small in refractive lenses. Differentiation of Eq. (2) by λ yields $$df/d\lambda=-f^2(dn/d\lambda)/R. \quad (3)$$

(dn/dλ) is a material dependent dispersion, which is very small for ordinary lens materials. Thus the focal length change is also small for refractive-type lenses.

The above gives an explanation of properties of refractive type lenses. The next object (a work piece) of consideration is Fresnel lenses. A Fresnel lens is composed of a set of many annular slants and annular precipices, which can be designed from a shape of a corresponding refractive type lens. When a ray passes a point of a thickness d(r) at a radius r, the optical path length in the lens is longer than that in vacuum by (n−1)d, which is a difference between a vacuum path length d and an in-lens path length nd.

$$\phi(r)=-2\pi(n-1)d(r)/\lambda. \quad (4)$$

Since (n−1)d induces retardation of phase, a minus sign appears in Eq. (4). Here d(r) is a thickness at a spot of a radius r of the lens. Eq. (4) is valid for general thicknesses d(r) including the case of Eq. (1).

FIG. 3 denotes schematic half sectional views of a refractive lens (a), a Fresnel lens (b) and a binary lens (c) as functions of a radius coordinate r. The bottom figure is a half section of the refractive type lens (a), which has a smooth surface having a thickness distribution expressed by Eq. (1). The Fresnel lens (b) is made from the refractive lens by circularly dividing the smooth spherical surface (a) at every decrease of a unit height λ/(n−1), lifting annular partial slants up to the top level and making a set of discontinual annular slants and annular precipices. The Fresnel lens (b) of FIG. 3 has many steps (precipices) of the height of λ/(n−1) and many annular slants, whose slanting angles become steeper with increasing radius r. The difference step λ/(n−1) corresponds to a phase difference of 2π of light waves. Since light is waves, the difference of 2π makes no change of the wavefunctions. The m-th ring radius $r_m$ is defined as $r_m$ satisfies $$\phi(r)=-2\pi m. \ (m=1, 2, 3, \ldots) \quad (5)$$

A Fresnel lens is designed by dividing the surface of a refractive lens at the m-th ring radius and raising the edges to the common top level. The scope of thickness variations is λ/(n−1). The Frenel lens (b) of FIG. 3 is a half section of the Fresnel lens. If the starting refraction lens (a) is a flat-convex lens of a curvature radius R of Eq. (1), Eqs. (1), (4) and (5) give the m-th ring radius $r_m$ $$r_m=\{2m\lambda R/(n-1)\}^{1/2}. \ (m=1, 2, 3, \ldots). \quad (6)$$

The Fresnel ring radii vm increase in proportion to roots of the order parameter m. Thus the interval $r_m-r_{m-1}$ decreases with increasing the order m.

$$r_m-r_{m-1}=\{2\lambda R/(n-1)\}^{1/2}/\{m^{1/2}+(m-1)^{1/2}\}. \quad (7)$$

A Fresnel lens is composed of many annular rings. An annular ring consists of an oblique wall and a vertical wall. The oblique wall will be here called an annular "slant" (slant in short). The vertical wall is called an annular "precipice" (precipice in brief). The first slant is the central convex part. The second annular slant is the next oblique annulus. Slants are defined in order. The first precipice is the first step $r=r_1$. The m-th precipice is the m-th step. The m-th slant is an oblique part held between the (m−1)-th precipice and the m-th precipice. Eq. (7) denotes a radial width of the m-th slant. At the m-th ring (m≧2), the radial width of the slant is described by Eq. (7) and the height of the precipice is λ/(n−1). An oblique angle $Y_m$ of the m-th slant to the horizontal plane is $$Y_m = \{\lambda/(n-1)\}/[\{2\lambda R/(n-1)\}^{1/2}/\{m^{1/2}+(m-1)^{1/2}\}] \quad (8)$$

$$= \{\lambda/(n-1)\}^{1/2}\{m^{1/2}+(m-1)^{1/2}\}/\{2R\}^{1/2}$$

$$= \{2\lambda R/(n-1)\}^{1/2}[\{m^{1/2}+(m-1)^{1/2}\}/2]/R.$$

Eq. (6) shows the dividend of Eq. (8) is an average radius $<r_m>$ of the m-th annular slant, where $<\ldots>$ means an average. An average oblique angle $Y_m$ of the m-th slant is $$Y_m=<r_m>/R. \quad (9)$$

The oblique angle of the slant coincides to the oblique angle Y=r/R at a radius r of the original refractive lens (Eq. (1)). It is a matter of course. The Fresnel lens (b) has the same oblique angles at every point as the base refractive lens (a). The refraction function in the Fresnel lens is the same as the refraction lens. Equality of the oblique angles has been confirmed for clarifying that the Fresnel lens has convergence power based upon the refraction function similar to the refractive lens.

A refractive lens has a large thickness variation. An aperture D and a focal length f require a refractive lens to have a large thickness variation $(D/2)^2/2(n-1)f$ from a refractive lens. Such a large required thickness variation prohibits us from thinning refractive lenses. Refractive lenses are heavy, thick and expensive.

On the contrary, a Fresnel lens has a small thickness variation $\lambda/(n-1)$, which is the unit height of a precipice. $\lambda/(n-1)$ is far smaller than $(D/2)^2/2(n-1)f$. The small thickness variation enables Fresnel lenses to be thin and light. Resin molding allows us to produce cheap, light thin plastic Fresnel lenses at low cost.

A general expression of thickness distribution h(r) of a Fresnel lens which has the same convergency as a reference refraction-type lens having a continual thickness distribution d(r) is given by $$h(r)=\text{mod }\{d(r),\lambda/(n-1)\}+h_0. \quad (10)$$

Here $h_0$ is a base thickness of the lens, and d(r) is a continual thickness distribution of the reference refractive lens. The symbol, "mod {A, B}" means the rest of dividing A by B. Namely when A=sB+q for some integer s (0≦q<B), mod {A, B}=q. $\lambda/(n-1)$ corresponds to one wavelength difference in a medium of a refractive index n. Instead of $\lambda/(n-1)$, $m\lambda/(n-1)$ (m; integer), which is m-times as large as $\lambda/(n-1)$, is also available for the latter term in the mod bracket. The diffraction efficiency is the highest at m=1 (the first diffraction). Thus Eq. (10) employs $\lambda/(n-1)$ as a divisor.

Here $\lambda/(n-1)$ is the height of a precipice (or vertical height of a slant). The height h(r) of slants is determined by subtracting a multiple of $\lambda/(n-1)$ ($\lambda/(n-1)$, $2\lambda/(n-1)$, $3\lambda/(n-1)$, . . . ) from the slant height d(r) and keeping a height variation (h(r)-$h_o$) smaller than the precipice height $\lambda/(n-1)$. The function h(r) determines the heights of concentric slants.

The slopes of the concentric slants are similar to the slope of the starting refraction-type lens (Ym=Y). A Fresnel lens has a convergence (or divergence) function only by refraction caused by the slopes of the concentric slants. Geometric optics can describe the convergence and lens function of the Fresnel lens. The Fresnel lens has advantages of lightness, inexpensiveness and low-cost (in the case of plastic lenses).

The Fresnel lens has a neutral character. In addition to refraction, the Fresnel lens has a diffraction function. Diffraction is an operation inherent to waves. It may sound strange that the Fresnel lens invites diffraction, but it is true. Both diffraction and refraction accompany a Fresnel lens. Diffraction can be explained by Heugence's principle. Waves starting from a point make concentric waves of a common phase. Propagating waves can be described as superpositions of concentric waves starting from the original points.

In the case of a refractive type lens, all the phases of the waves passing through the refractive lens are identical at any wavefronts. The converging point by diffraction coincides with the converging point by refraction. Thus diffraction is ignored in the calculation of the optics built by refractive lenses. However, it does not mean that refractive lenses are free from diffraction. Diffraction does exist in refractive lenses. But the result of diffraction coincides with the result of refraction. The diffraction must not be considered in refractive lenses.

In the case of a Fresnel lens having a sawtoothed section, refraction still dominates over diffraction. Individual parts are called elementary rings. An elementary ring consists of a slant which is a slanting circular plane and a precipice which is a vertical wall. Slants of elementary rings are important, because the slanting angles of the slants rule refraction. Refraction is dominant owing to the wide slants. The sawtoothed shape (slant and precipice) induces diffraction also in a Fresnel lens. What results from diffraction? Waves originating from neighboring edges of the elementary rings converge at a point where the distance from single neighboring edges differs by one wavelength unit ($\lambda/(n-1)$). This is the first diffraction. Since a pair of the neighboring rings have separated by a precipice of $\lambda/(n-1)$, the rays emitted from corresponding spots of the two slants converge at a focus with one wavelength difference. Thus the focus of reflection is the first-diffraction focus at the same time. In a Fresnel lens, the foci of refraction and the first-diffraction are common. Namely a Fresnel lens makes an image by refraction at a focus and produce the same image by the first-diffraction at the same focus. Of course, higher order diffraction exists. The higher order diffraction makes images different from the images by refraction.

Fresnel lenses have no serious problem, because the focus of the first-diffraction image is the same as the focus of the refraction image. However, the image by a Fresnel lens is not entirely equal to the image by a refraction-type lens. The Fresnel lens causes 0th-order, +2nd-order, +3th-order, . . . diffractions and −1st-order, −2nd-order, . . . diffractions in addition to the first-order diffraction. Only the first-order diffraction coincides with the result of refraction. Extra diffractions, 0th-order, +2nd-order, +3th-order, . . . diffractions and −1st-order, −2nd-order, . . . diffractions, make different images at different converging points. The 0-th order diffraction has an infinite long focal distance. The ±m-th order diffractions have converging points at ±f/m, where f is the focal distance of the first-order diffraction and m is an integer. The plus sign (+) means convergence and the minus sign (−) means divergence. Thus a Fresnel lens makes images of ±m-th order diffractions at points distanced from the first-order diffraction focus. The power of the extra order diffractions is not large at the first-order focus. Therefore Fresnel lenses do not take diffraction into account. But diffraction exists. Diffraction disperses power of waves to multipoints (±f/m) lying on the light axis in the Fresnel lenses.

Fresnel lenses have advantages of inexpensiveness, thinness and lightness. However Fresnel lenses have two serious drawbacks. One is fixation of a wavelength of object (a work piece) light. The height of precipices is $\lambda/(n-1)$. A Fresnel lens is applicable only to one wavelength λ, which is equal to (n−1)P, where P is the height of a precipice. For example, when the wavelength is 0.5 µm and the refractive index is n=1.5, the height of a precipice is uniquely determined to be P=1 µm. The Fresnel lens designed for a laser beam with a 1 µm long wavelength can only be used for monochromatic light with a 1 µm wavelength. The Fresnel lens exhibits the designed focal length and the designed convergence only for 1 µm wavelength light. The Fresnel lens is inapplicable to extra light except the designed wavelength. Fresnel lenses have a strong wavelength-dependence. This is a drawback of Fresnel lenses.

Strictly speaking, the refraction of a Fresnel lens is not fully identical to the refraction of a refraction-type lens. At a precipice, the Fresnel lens changes the thickness suddenly by λ/(n−1). The refraction function of a Fresnel lens is similar to that of a refractive-type in the rays parallel to the optical axis but is different from in the rays which are not parallel to the axis. The Fresnel lens is inferior to the refraction lens in the non-parallel rays. This is, however, not a significant problem.

Another problem of Fresnel lenses is the difficulty of shaping because of many concentric rings with circular precipices and circular slants. Plastic Fresnel lenses can be cheaply produced by molding. However, in the case of hard materials, e.g., quartz, molding is unfit to make a lens. A quartz Fresnel lens should be made by cutting and grinding a quartz disc. It is difficult to cut exactly multi-concentric slants and precipices. Grinding is also difficult. Thus Fresnel lenses made of glass or quartz are not inexpensive.

Thus modified Fresnel lenses have been contrived by quantizing continual slants into a discrete stepwise structure, for example, two steps, four steps, eight steps, sixteen steps, . . . , or g steps (g: division number, $g=2^b$; b: integer) for facilitating production. Fresnel lenses and stepped Fresnel lenses are called thickness modulating diffractive lenses for discriminating other types of diffractive lenses, which will be described later. For example, sixteen step modified Fresnel lenses (g=16, b=4) are designed by dividing a circular slant with a height λ/(n−1) of a reference Fresnel lens into sixteen steps. Here a step has a height λ/16(n−1). A discrete surface of the g step modified Fresnel lens is described by a surface thickness function $h_g(r)$ $$h_g(r) = \{\lambda/g(n_f-1)\} \cdot int[g \cdot \bmod \{(n-1)d(r)/\lambda, 1\}] + h_0. \quad (11)$$

Here g is a division number, g of $h_g$ is a suffix denoting the division number, d(r) is a thickness distribution of the reference refractive lens, n is a refractive index of the reference refractive lens, $n_f$ is a refractive index of the stepped Fresnel lens and $h_0$ is a base thickness. The symbol int{ . . . } means an integer obtained by eliminating the decimal fraction of the value bracketed { . . . }. Namely int{X} is the maximum integer which does not exceed X. For example, when the division number is four (g=4, b=2), a 4-step modulated Fresnel lens is described by $$h_4(r) = \{\lambda/4(n_f-1)\} int[4 \bmod \{(n-1)d(r)/\lambda, 1\}] + h_0, \quad (12)$$

where the division number is 4, d(r) is a thickness distribution of the reference refractive lens, n is a refractive index of the reference refractive lens, $n_f$ is a refractive index of the stepped Fresnel lens and $h_0$ is a base thickness.

When the division number is eight (g=8, b=3), a 8-step modulated Fresnel lens is defined by $$h_8(r) = \{\lambda/8(n_f-1)\} int[8 \bmod \{(n-1)d(r)/\lambda, 1\}] + h_0, \quad (13)$$

where the division number is 8, d(r) is a thickness distribution of the reference refractive lens, n is a refractive index of the reference refractive lens, $n_f$ is a refractive index of the stepped Fresnel lens and $h_0$ is a base thickness.

When the division number is sixteen (g=16, b=4), a 16-step modulated Fresnel lens is defined by $$h_{16}(r) = \{\lambda/16(n_f-1)\} int[16 \bmod \{(n-1)d(r)/\lambda, 1\}] + h_0, \quad (14)$$

where the division number is 16, d(r) is a thickness distribution of the reference refractive lens, n is a refractive index of the reference refractive lens, $n_f$ is a refractive index of the stepped Fresnel lens and $h_0$ is a base thickness.

The lenses designed by quantizing continual circular slants of a Fresnel lens into discrete steps are called "quantized-step lenses".

When the division number g is large enough, for example, g=16 (b=4) or g=256 (b=8), the stepped surface of the diffraction lens is similar to the original Fresnel lens. Somebody would think that the rays going into the lens should be refracted under the law of refraction. But it is wrong. The rays obeying the law of refraction do not converge and disperse in vain without making any image. Refraction is insignificant in the diffraction lens. Instead of refracted rays, diffraction converges the rays at the focus.

It is difficult to produce diffraction lenses of high division number g. Production of plenty of annular slants and precipices by grinding rigid materials incurs high cost. The production cost raises with increasing division number g.

The most inexpensive choice is to adopt the simplest diffractive lens of a division number 2 (g=2, b=1). The lens has only two kinds of heights or thicknesses. Since the lens has only two kinds of steps, the simplest lens is called a binary lens. The steps are all vertical to the axis. Convergency depends only upon diffraction. Refraction has no convergency in the binary lens. The thickness $h_2(r)$ of a binary lens is given by $$h_2(r) = \{\lambda/2(n_f-1)\} int[2 \bmod \{(n-1)d(r)/\lambda, 1\}] + h_0. \quad (15)$$

FIG. 3(c) denotes a half section of a binary lens. Comparison of FIG. 3(b) and FIG. 3(c) clarifies how to make a binary lens (c) from an original Fresnel lens (b). Slants of (b) are divided into two parts by comparing the heights of slants with a half wavelength depth λ/2(n−1). Parts higher than the half wavelength height are allocated to top annuli. Other parts lower than the half wavelength height are allotted to bottom annuli. The difference between the top and the bottom annuli is λ/(n−1). The binary surface is a rough approximation of the Fresnel lens (b). The binary lens converges incident rays by only diffraction. Refraction plays no role. Diffraction includes many orders. Only the plus first order (+1) diffraction converges the incident ray at the predetermined focus. Other orders of diffraction converge the rays at different points or diverge the rays.

The lens which is produced by quantizing the slants of a Fresnel lens by $2^b$ (=g) steps of microannuli having planes vertical to the beam axis is called a diffraction lens. The lens converges rays by diffraction besides refraction. The rate of diffraction to refraction increases as the step number $g=2^b$ decrease. Neighboring annuli are connected by microprecipices. The number of microannuli of the diffraction lens is $2^b$ times as large as the number of the slants of the Fresnel lens. All the annuli have parallel flat planes orthogonal to the beam axis. However, the diffraction is not increased with the increase of the step number g. Convergency by diffraction is not changed by the decrease of the step number g. Refraction decreases as the decrement of the step number g. Here, diffraction lenses include quantized-step lenses and Fresnel lenses. The Fresnel lens, which converges rays by both refraction and diffraction, has neutral properties.

As explained before, the diffraction lens has an eigen wavelength λ, which is determined by the height of the steps of λ/(n−1). The strong wavelength dependence is a weak point for the diffraction lens. The diffraction lens has not a full converging function for wavelengths other than the eigen wavelength.

What is caused by the use of non-eigen wavelengths in diffraction-type lenses? What occurs when the incident wavelength is changed with maintaining the step height, step width and step number in a diffraction lens? Hitherto the wavelength and the focal length have been denoted as λ and f, which take constant values. From now wavelengths and focal lengths are variable parameters. To discern the constant ones, variable wavelengths and variable focal lengths are denoted by $\Lambda$ and $F$ in capital letter. The boundaries of annular slants are given by Eq. (6).

$$r_m = \{2m\lambda R/(n-1)\}^{1/2}. \ (m=1, 2, 3, \ldots) \tag{6}$$

The difference between the distance from the focus F to the m-th precipice ($r=r_m$) and the distance from the focus F to the (m−1)-th precipice ($r=r_{m-1}$) is $\Lambda$.

$$\Lambda = (F^2 + r_m^2)^{1/2} - (F^2 + r_{m-1}^2)^{1/2}. \tag{16}$$

Since $r_m, r_{m-1} \ll \Lambda$, Eq. (16) is approximated to $$\Lambda = r_m^2/2F - r_{m-1}^2/2F. \tag{17}$$

Substitution of Eq. (6) into Eq. (17) produces $$2F\Lambda = \{2m\lambda R/(n-1)\} - \{2(m-1)\lambda R/(n-1)\} \tag{18}$$
$$= 2\lambda R/(n-1).$$

The lens has the standard focal length $f$ ($f=R/(n-1)$) for the standard wavelength $\lambda$ as aforementioned. Eq. (18) is rewritten to $$F\Lambda = f\lambda. \tag{19}$$

The product of a wavelength $\Lambda$ and a temporal focal point $F$ is constant. This simple relation is obtained from the requirement that the light path difference between the rays emitting from neighboring slants should be $\Lambda$. Refraction is not taken into account for deriving Eq. (19). Diffraction enables the lens to converge non-standard wavelength ($\Lambda \neq \lambda$) rays at another focal point F (F≠f) different from the standard focus f. The temporal focal points F is inversely proportional to the wavelength $\Lambda$. However convergency is poor for non-standard wavelength $\Lambda$.

The diffraction type lens has large power of allocations to non-first order diffraction. The higher order diffraction gives the diffraction lens multifocal points (±F/m). The multifoci (±F/m) align on the central light axis before and after the lens. When the temporary wavelength $\Lambda$ is near to the standard wavelength $\lambda$, the first-order diffraction is dominant. The temporary first order focal length F is called the focal length of a set of the lens and the wavelength. "Wavelength dispersion" is defined as a ratio (dF/dΛ) of a focal length change dF to a wavelength change dΛ. In the refractive-type lens, the wavelength dispersion (dF/dΛ) is very small. Eq. (19) demonstrates that diffraction type lenses have very large wavelength dispersion unlike refractive type lenses. Differentiation of Eq. (19) of the diffraction-type lens gives the wavelength dispersion, $$dF/d\Lambda = -f\lambda/\Lambda^2 \cdot (\text{Diffraction lens}) \tag{20}$$

This is an expression of the wavelength dispersion of diffraction lenses. The wavelength dispersion Eq. (19) is always negative. Diffraction type lenses have large, negative wavelength dispersion. Since $\Lambda$ is as large as $\lambda$, the dispersion (dF/dΛ) is nearly equal to −f/λ. This means big negative wavelength dispersion. On the contrary, refractive-type lenses have very small dispersion which originates from the refractive index dispersion dn/dλ. The parameter dn/dλ is negative and small in refractive lenses. FIG. 4 demonstrates focal length variations caused by a wavelength change for a refractive lens and a diffractive lens. The wavelength change scarcely induces a focal length change in the refraction lens (left figure of FIG. 4). On the contrary, the diffractive lens has a wide change of focal points caused by the wavelength change (Right figure of FIG. 4).

The wavelength dispersion of the refractive lens has been given by Eq. (3)

$$(df/d\lambda) = -f^2(dn/d\lambda)/R \cdot (\text{Refractive lens}) \tag{3}$$

Material dispersion (dn/dλ), which is a small, negative value, gives very small positive wavelength dispersion to refractive type lenses. Diffraction lenses have negative wavelength dispersion far larger than refraction lenses. The large dispersion originates from the fact that the standard wavelength is fixed by the precipice height $P=\lambda/(n-1)$.

Properties of an ultrashort pulse laser are considered. Since a pulse width is femtoseconds ($10^{-15}$ s) to picoseconds ($10^{-12}$ s), the pulse is named here "ultrashort". The word "short" means not a short wavelength but a short pulse width Δt. Since the pulse width is farther shorter than nanosecond pulses, the pulse is named here "ultrashort". Sometimes the ultrashort pulse is called a femtopulse in this description, since the time width is an order of femtoseconds ($10^{-15}$ s). Monochromacity is one of the important features of laser light. Monochromacity means that the light only consists of a single wavelength. Continual wave lasers (CW) or long pulse lasers have monochromacity. However, in the case of the ultrashort pulse laser light, the uncertainty principle obscures the energy of an ultrashort pulse. The energy of light is given by $h\nu = hc/\lambda$. Since the pulse width is very short, the energy does not take a definite value. Thus the wavelength has uncertainty. Wavelengths of an ultrashort pulse disperse into a definite range around a standard wavelength $\lambda$. Energy dispersion or wavelength dispersion is a defect for lasers, since energy fluctuation contradicts the laser-inherent monochromacity. This is a defect of a femtosecond pulse laser. This invention, however, tries to make the best use of the wavelength fluctuation of the femotosecond pulse for prolonging a focal depth. The uncertainty principle says that the product of time fluctuation Δt and energy fluctuation ΔE or the product of momentum fluctuation Δp and displacement fluctuation Δx is not less than Plank's constant h. Energy E and time t are "conjugate" physical variables. Displacement x and momentum p are conjugate physical variables. The product of the fluctuations of conjugate variables is not less than h. The uncertainty principle is expressed by $$\Delta E \Delta t \geq h, \tag{21}$$

and $$\Delta x \Delta p \geq h. \tag{22}$$

Heisenberg first advocated the principle. Δ means a fluctuation of physical variables. The word "fluctuation" has been defined in various ways. A root-mean-square RMS, a standard deviation σ and an absolute value deviation average (<|x−m|>) are examples of fluctuation. Numerical factors are significant for this invention to obtain exact estimation. Thus fluctuation should be precisely defined for enabling us to calculate exact numerical factors. What is important is the product ΔtΔE of the time fluctuation Δt and the energy fluctuation ΔE. Stochastics teaches us that the distributions which minimize the fluctuation product are Gaussian distributions for both time and energy. Thus the relation between numerical coefficients of energy and time fluctuations is considered upon the assumption of gaussian distributions for both time and energy. The expression of energy of light is accompanied by the plank constant h. For simplifying expressions, angular frequency ω is adopted in stead of energy E. The angular frequency ω is related to energy by an equation $h\omega = 2\pi E$. A Gaussian function can be expressed in a simple form by a standard deviation. The standard deviation of angular frequency fluctuation is denoted by $\epsilon$. The standard deviation of time fluctuation is denoted by $\eta$. It is assumed that both time and angular frequency fluctuations take Gaussian distributions.

A normalized Gaussian angular frequency distribution is written as, $$(2\pi\epsilon^2)^{-1/2}\exp(-\omega^2/2\epsilon^2). \quad (23)$$

Here a "normalized" function $g(\omega)$ means that the integration of the variable in a full range is 1. Namely $\int g(\omega)d\omega=1$.

A normalized Gaussian time distribution is expresses by $$(2\pi\eta^2)^{-1/2}\exp(-t^2/2\eta^2). \quad (24)$$

Fluctuation distributions of conjugate variables are reversibly connected by Fourier transformations. Irrespective of the assumption of the Gaussian distributions, a Fourier transformation of the angular distribution is the time distribution. A Fourier transformation of the time distribution is the angular distribution. Fourier-transforming of Eq. (23) gives $$(2\pi)^{-1/2}(2\pi\epsilon^2)^{-1/2}\int \exp(-\omega^2/2\epsilon^2)\exp(-j\omega t)d\omega = (2\pi)^{-1/2}\int\exp(-t^2\epsilon^2/2). \quad (25)$$

This expression denotes the time dependent distribution of an ultrashort pulse. Eq. (24) and Eq. (25) should represent an identical time distribution.

$$\epsilon=1/\eta. \quad (26)$$

The result teaches us that the time fluctuation and angular frequency fluctuation obeying Gaussian distributions give a product of the time and angular frequency standard deviations $\epsilon$ and $\eta$ which is always equal to 1 ($\epsilon\eta=1$). Non-gaussian distribution-obeying time and angular frequency fluctuations give a product larger than 1 ($\epsilon\eta>1$). General distributions including Gaussian and non-Gaussian give $\epsilon\eta \geq 1$. The Fourier transformation calculation Eq. (25) has been carried out for clarifying that the numerical factor of the product is 1.

The root-mean-square ($<\omega^2>$) of angular frequency distribution is named an angular frequency fluctuation. The average of $\omega^2$ is equal to $\epsilon^2$. The root of the average of $\omega^2$ is equal to $\epsilon$. Thus the root-mean-square of the angular frequency $\omega$ is equal to the standard deviation $\epsilon$.

The root-mean-square ($<t^2>$) of pulse time distribution is named a time fluctuation. The average of $t^2$ is equal to $\eta^2$. The root of the average of $t^2$ is equal to $\eta$. Thus the root-mean-square of the time t is equal to the standard deviation $\eta$.

The standard deviation $\sigma$ is the most popular representation of fluctuation of stochastic variables. However, the standard deviation is not always a parameter which is favorable for measurements.

The standard deviation cannot be directly determined from the measured spectrum. Thus a full width at half maximum (FWHM) is employed for representing fluctuation instead of the standard deviation $\sigma$.

The FWHM is defined as a full width of a peak at the height of half of the maximum. The FWHM can be directly measured from a spectrum graph unlike the standard deviation $\sigma$.

If object (a work piece) stochastic variables follows a Gaussian distribution, a clear relation holds between the FWHM and the standard deviation $\sigma$. Eq. (23) is a distribution function of angular frequencies of wavefunction of light. Actual experiments measure squares of wavefunctions. An actual measured angular frequency distribution function is given by squaring Eq. (23). Squaring replaces "2" at the denominator in $\exp(\ldots)$ by "1". The FWHM of the angular frequencies is denoted by $\Delta\omega$. The half width is $\Delta\omega/2$. Substituting $\Delta\omega/2$ into the angular frequency distribution function squared Eq. (23) should make $1/2(=0.5)$ owing to the definition of the FWHM.

$$\exp(-(\Delta\omega/2)^2/\epsilon^2)=1/2 \quad (27)$$

Since the maximum of the lefthand term is 1, the righthand term 1/2 means a half of the maximum. Natural logarithm having "e" as a bottom is described as "ln". Natural logarithms of both terms show a relation of, $$\Delta\omega=2(\ln 2)^{1/2}\epsilon. \quad (28)$$

The FWHM (full width at half maximum) $\Delta\omega$ is a value of the same order as the standard deviation $\sigma$. But $\Delta\omega$ and $\sigma$ are not rigorously identical. The ratio of dividing $\Delta\omega$ by $\epsilon$ is $2(\ln 2)^{1/2}$. In the present description, numerical constants $2(\ln 2)^{1/2}$ or $2 \ln 2$ often appear. The constants are born by replacing the standard deviation $\epsilon$ by the FWHM $\Delta\omega$ in the Gaussian function. $2 \ln 2=1.386$ and $2(\ln 2)^{1/2}=1.665$. Approximate calculations would deem $\Delta\omega$ identical to $\epsilon$ by neglecting the numerical factors. But the present invention aims at obtaining the exact solution of designing optical devices and tries to calculate exactly the numerical constants. However, the results are relied upon the assumption of the Gaussian distribution. Actual distribution is not exactly gaussian. Thus the relation between $\Delta\omega$ and $\epsilon$ may deviate from the ratio of $2(\ln 2)^{-1/2}$ in actual ultrashort (femtosecond) laser pulses.

Similarly, $\Delta t$ denotes a full width of half maximum (FWHM) of time of a femtosecond pulse. Eq. (24) shows a time-dependent distribution of an ultrashort pulse. Measurable distribution is given by a square of Eq. (24). The definition of the FWHM gives 1/2 to the square of Eq. (24) at $t=\Delta t/2$.

$$\exp(-(\Delta t/2)^2/\eta^2)=1/2. \quad (29)$$

Then $$\Delta t=2(\ln 2)^{1/2}\eta. \quad (30)$$

If the pulse duration time (pulse widths) follows an ideal Gaussian distribution, $\epsilon\eta=1$, where $\epsilon$ is the standard deviation of angular frequencies and $\eta$ is the standard deviation of pulse widths (duration time). Usual distributions other than the Gaussian function give $\epsilon\eta \geq 1$.

Eq. (28) and Eq. (30) establish an inequality $$\Delta\omega\Delta t \geq 4 \ln 2. \quad (31)$$

The pulse width FWHM $\Delta T$ and the angular frequency FWHM $\Delta\omega$ are connected by the above uncertainty rule. In the case of holding the equality both the frequency and the pulse width have Gaussian distributions. Attention should be paid that the symbol "$\Delta$" which denotes not a standard deviation but a full width at half maximum (FWHM).

What is important is the minimum fluctuation of pulse widths and frequencies. Thus the minimum fluctuation is considered by assuming $\epsilon\eta=1$.

$$(\text{At the minimum of fluctuations})\Delta\omega\Delta t=4 \ln 2. \quad (32)$$

Assuming that the pulse width $\Delta t$ has been known, Eq. (32) means that the minimum of the product of the frequency fluctuation $\Delta\omega$ and the pulse width $\Delta t$ should be $4 \ln 2=2.77$.

$$\omega=2\pi\nu=2\pi c/\Lambda, \quad (33)$$

where $\nu$ is the frequency of the laser pulse light, c is a light velocity ($c=3\times10^8$ m/s in vacuum or air) and $\Lambda$ is the wavelength of the laser light. Differentiation of Eq. (33) makes a differential expression, $$d\omega=-2\pi c d\Lambda/\Lambda^2, \quad (34)$$

where $d\omega$ is an infinitesimal change of $\omega$ and $d\Lambda$ is an infinitesimal change of $\Lambda$. The ratio of fluctuations is equal to the ratio of the infinitesimal changes. The fluctuations satisfy the ration determined by Eq. (33). The FWHMs are ones of fluctuations, which are defined by positive values. The FWHM of the wavelength fluctuation is denoted by $\Delta\Lambda$ and the FWHM of pulse width fluctuation is denoted by $\Delta t$. Inequality (31) and Eq. (34) yield an inequality determining the minimum of $\Delta\Lambda$ $$\Delta\Lambda \geq 2(\ln 2)\Lambda^2/c\pi\Delta t. \quad (35)$$

The narrower the pulse widths $\Delta t$ of laser light are, the wider the fluctuation of wavelengths increase. For example, when the pulse width is 100 fs and the wavelength is 800 nm, namely $\Delta t = 100$ fs $= 10^{-13}$ s and $\Lambda = 800$ nm $= 0.8$ $\mu$m $= 0.8 \times 10^{-5}$ m. The minimum $\Delta\Lambda_{min}$ of wavelength fluctuation FWHM is $$\Delta\Lambda_{min} = 0.0094 \text{ }\mu\text{m} = 9.4 \text{ nm}. \quad (36)$$

The example shows the occurrence of a big wavelength fluctuation for ultrashort pulses. The big wavelength fluctuation is an inherent drawback of ultrashort pulses.

The inventors of the present invention tried to exploit the inherent drawback by contraries. The present invention makes the best use of the double drawbacks of diffraction lenses and ultrashort pulses for obtaining a long focal thickness. The present invention converts the drawbacks into advantages.

In a diffraction-type lens, the change of an effective wavelength $\Lambda$ induces a large change of the focal length in inverse proportion to the wavelength $\Lambda$, as clarified before. Hence, $$\Delta F = \Delta\Lambda F/\Lambda \geq 2(\ln 2)\Lambda F/c\pi\Delta t. \quad (37)$$

Since $\lambda f = \Lambda F$, the effective wavelength $\Lambda$ and the effective focal length $F$ are replaced by the standard wavelength $\lambda$ and the standard focal length $f$ in Inequality (37).

$$\Delta F \geq 2(\ln 2)\lambda f/c\pi\Delta t. \quad (38)$$

Inequality (38) denotes the fact that a diffraction lens causes a focal length change $\Delta F$ for an ultrashort pulse ($\Delta t$). The focal length change $\Delta F$ is inversely proportional to the pulse width $\Delta t$. A shorter pulse width causes a larger focal length change.

Another important parameter is a focal depth. The focal depth is defined as a length of the region near beamwaist whose sectional area is smaller than four times as large as the beamwaist section. FIG. 2 shows convergence of parallel laser beam by a lens. The beamwaist is a point having the minimum section of rays. The beamwaist is produced at the focal point. The periphery of a beam is defined as an envelope of the points having power density of $e^{-2}$ times as small as that of the center. The radius of the beamwaist is a distance from the center to a point at which the power density falls to $e^{-2}$ times that of the center. The radius of a parallel incidence laser beam following the Gaussian power density distribution is denoted by $w_o$. The laser beam radius $w_o$ is a large value of an order of millimeters. The parallel laser beam of a wavelength $\lambda$ is converged by the lens with a focal length $f$. The beamwaist is produced at the focus of the lens. Ideal Gaussian power distribution gives the beamwaist a radius $w_1$, $$w_1 = \lambda f/\pi w_0. \quad (39)$$

A virtual, imaginary, ideal parallel light beam without diffraction would perfectly converged to a point of a 0 diameter ($w_1 = 0$) at a focus by a lens. But diffraction always accompanies actual laser beams. The diffraction gives a definite size $w_1$ to the converged beam at the focus. Thus the section of a definite size at the focus is called a beamwaist. The radii $w_o$ and $w_1$ are defined as the distances from the beam center to the points at which the power density decreases to $e^{-2}$ times that of the central density in the case of Gaussian distribution beams. The incident beam radius $w_o$ is slightly different from the incident beam width FWHM $\Delta i$. The ratio $\Delta i/w_0$ should be determined. The incident beam width FWHM $\Delta i$ is twice that of the distance $r = \Delta$ which gives half power ($0.5 = e^{-0.69}$) of the beam center. The incident beam radius $w_0$ is the distance $r = w_0$ which gives $e^{-2}$ times as small as that of the beam center. Namely the gaussian function is expressed by $\exp(-2(r/w_0)^2)$. For $r = \Delta i/2$, $0.5 = \exp(-2(\Delta i/2w_0)^2)$, then $0.69 = 2(\Delta i/2w_0)^2$.

$$\Delta i/w_0 = 2 \times (0.69/2)^{0.5} = (2\ln 2)^{0.5} \quad (40)$$

The FWHM of the incident laser beam is $\Delta i$. The incident beam radius $w_0$ is $w_0 = \Delta i/(2 \ln 2)^{0.5}$. Substituting (40) into Eq. (39) gives the beamwaist $w_1$ of the beam converged by the lens with a f focal length, $$w_1 = (2\ln 2)^{0.5} \lambda f/\pi\Delta i. \quad (41)$$

The focal depth z of a refractive-type lens, which has a focal length $f$, should be defined. There are some different definitions of the focal depth. A virtual cylinder is assumed to have a radius equal to the beamwaist $w_1$. The rays converged by a lens have an envelope (fire lines) of twin cones. The cones have two crossing circles with the virtual cylinder before and after the focus. The distance between the front crossing circle and the rear crossing circle is defined as the focal depth z.

FIG. 2 denotes the definition of the focal depth. A laser emits a parallel beam with a radius $w_0$. A lens converges the laser beam. The converged beam forms a beamwaist of a radius $w_1$ at the focus. The beamwaist radius $w_1$ is given by Eq. (39) for a Gaussian laser beam. But the beamwaist radius $w_1$ is larger than the value of Eq. (39) for a non-Gaussian beam. In FIG. 2, the inclination angle of fire lens of beams converged by the lens is $w_0/f$, because the incident beam radius is $w_0$. Virtual sections having a radius equal to the diameter $2w_1$ of the beamswaist are imagined within the fire lens. A cylinder having both virtual sections of the $2w_1$ radius are assumed in the fire lines. The length of the assumed cylinder is the focal depth $\delta z$. Since the radius is $2w_1$ and the focal depth $\delta z$ is equal to a quotient $2w_1 f/w_0$ of dividing $2w_1$ by $w_0/f$. Here "$\delta$" does not mean differentiation. $\delta$ is attached to z for denoting the focal depth, since the cyclindrical range in the focal depth is a z-direction restricted region having energy density larger than a definite value. The sign "$\delta$" should be clearly discerned from the other sign "$\Delta$", which means an FWHM (Full Width at Half Marium)

$$\delta z = 2w_1/(wo/f) = 2\lambda f^2/\pi wo^2 = (4\ln 2)\lambda f^2/\pi(\Delta i)^2 \quad (42)$$

Hereafter the central idea of the present invention is described. The focal depth $\delta z$ of Eq. (42) derives from assumptions of the Gaussian laser beam and a refractive type converging lens. Eq. (42) determines an ideal relation between $\Delta i$ and $\delta z$. If the incident laser beam is a non-Gaussian beam, the beamwaist $w_1$ becomes larger than $w_1$ of Eq. (39). $\delta z$ takes a longer depth than the Gaussian incident beam. When a diffractive-type lens is employed, the focal depth is represented by Eq. (42) as well as a refractive-type lens.

Hitherto it has been explained that diffractive lenses bear large wavelength dispersion where in a way that a temporary focal length F changes in inverse proportion to a temporary wavelength $\Lambda$ when $\Lambda$ deviates from the standard wavelength $\lambda$. It has been also clarified that an ultrashort pulse includes a variety of wavelengths of light waves due to the ultrashortness of a pulse width. Therefore, an ultrashort laser pulse includes elementary waves of various wavelengths which cause a large focal length variation $\Delta F$. Usual optical apparatuses dislike the focal length variation $\Delta F$, which would disperse laser power.

The present invention tries to make the best use of the focal length variation $\Delta F$. When the focal length $\Delta F$ changes, the focal point at which a parallel beam converges, varies, as shown in FIG. 4. Multiwavelength induces multifocus. The scope of focal points is denoted by $\Delta f$. Since the focal depth displaces with the focus, the effective focal depth is increased by the axial change of the focal points (multifocal points). At a temporary wavelength $\Lambda$ having a focal length F, the rays converge at positions from $-\delta z/2 + F$ to $+\delta z/2 + F$ on the axis. The focal length $\Lambda$ itself varies in a range from $-\Delta F/2 + f$ to $+\Delta F/2 + f$. As a whole, rays converge on the axis in a range from $-\delta z/2 - \Delta F/2 + f$ to $+\delta z/2 + \Delta F/2 + f$. The focal length is prolonged from $\delta z$ to $\delta z + \Delta F$. The additional extra focal length $\Delta F$ is the gist of the present invention.

Among the factors, $\delta z$ is the inherent focal length which accompanies also refraction-type lenses. The extra focal length $\Delta F$, however, derives from the coupling of the diffractive-type lens and the ultrashort pulse. $\Delta F$ enlarges the focal length. However, too small $\Delta F$ is insignificant, because the focal length is not so much prolonged. If $\Delta F$ is longer than $\delta z$, the substantial focal length is increased by more than two times as long as the inherent one $\delta z$. If $\Delta F$ is far larger than $\delta z$, the actual focal length is raised by several times as long as $\delta z$. If the ratio $\Delta F/\delta z$ is denoted by q, the focal length is prolonged up to $(q+1)$ times as long as $\delta z$. A Z-parameter Zp is defined to be, $$Zp = \delta z/\Delta F. \quad (43)$$

If Zp is less than 1 ($Zp \leq 1$), the focal length is multiplied by a sum $(Zp^{-1} + 1)$ of the reciprocal of Zp and 1. Assuming that $\Delta F$ takes the minimum value for a given $\Delta t$, Inequality (38) and Eqs. (42) and (43) give the Z-parameter an expression, $$Zp = 2c\Delta t f/\Delta i^2. \quad (44)$$

The Z parameter Zp is a value obtained by dividing twice product of the FWHM pulse width $\Delta t$, the focal length f and the light velocity c by a square of the incident beam width $\Delta i$. The present invention requires $Zp \leq 1$ for deepening the focal depth effectively. Attention should be paid the fact that Zp does not contain the wavelength $\lambda$. The focal depth is used to increase in proportion to the wavelength $\lambda$. However, Zp contains no wavelength. The Z parameter Zp is not a focal depth itself. Zp is a quotient of the inherent focal depth divided by the extension (fluctuation) of the focal length. In diffractive lenses, the focal length f is in proportion to the wavelength $\Lambda$. The focal depth is similar to the focal length in the wavelength dependence. Thus Zp does not contain the wavelength, since the wavelength dependence cancel each other. The condition $Zp \leq 1$ can be explicitly rewritten into $f\Delta t/\Delta i^2 \leq 1.67 \times 10^{-9} \mathrm{m}^{-1}$ s. The present invention restricts that FWHM pulse width $\Delta t$ should be less than 20 ps. The maximum pulse width (20 ps) gives an inequality $f/\Delta i^2 \leq 83 \mathrm{~m}^{-1}$. The inequality imposes a rigorous requirement upon the FWHM incident beam width $\Delta i$. Even if f=50 mm, $\Delta i \geq 24$ mm. This means a very large diameter of a laser beam. The laser apparatus which can produce such a large diameter beam is very large and much expensive. When f=100 mm and $\Delta t$=1 ps, the incident beam width should be larger than 7.7 mm ($\Delta i \geq 7.7$ mm). $Zp \leq 1$ can be deemed to define the minimum of the incident beam width $\Delta i$. A larger beam $\Delta i$, a shorter f and shorter pulse width $\Delta t$ give a lower Zp.

Shortening the focal length f is one contrivance for lowering the Z parameter Zp in diffraction lenses. It requires an increase of the number of annular slants and annular precipices. Narrowing the pulse width $\Delta t$ is another contrivance for lowering the Z parameter Zp in diffraction lenses. In this case, the time power density should be intensified for avoiding shortage of effective power density.

The present invention restricts the FWHM pulse width $\Delta t$ below 20 ps ($\Delta t \leq 20$ ps, ps=$10^{-12}$ s). Short pulses, for example, 100 ft and 50 ft (ft=$10^{-15}$ s), can reduce the Z parameter Zp. An alternative is to widen the incident laser beam FWHM width $\Delta i$. The present invention can be interpreted to be a guide for restricting the minimum of the incident laser beam FWHM width $\Delta i$. The Z parameter Zp includes three independent parameters. Regulating three parameters can give Zp a value lower than 1.

$$Zp \leq 1. \quad (45)$$

The above procedure teaches us that a quotient of the focal depth z divided by Zp gives the focal length fluctuation, which is an effective increase of the focal depth.

The Z-parameter is a positive value. Thus $$0 < Zp \leq 1. \quad (46)$$

The range is suitable for Zp.

The motivation for defining a range of Zp between 0 and 1 appears for the purpose of restricting spatial broadening of the pulse in a definite region. When the spatial broadening is insignificant, the restriction imposed upon Zp is a range from 0 to 1 given by inequality (46).

In the refraction lens, the optical length of a near-axis ray running on the axis to the focus is equal to the optical length of a far-axis ray running at the periphery to the focus. Thus there is no delay time between the near-axis ray and the far-axis ray in the refractive lens. On the contrary, there are optical path differences between the near-axis ray and the far-axis ray. Since the thickness is common for the center and the periphery, the far-axis ray has a longer optical path than the near-axis ray in the diffraction lens. The optical path length of the nearest-axis ray is f. The optical path length of the farthest-axis ray is $(f^2+r^2)^{1/2}$, where r is a radial coordinate of the farthest axis ray. The difference of the optical path lengths between the nearest-axis rays and the farthest-axis rays is $$(f^2+r^2)^{1/2} - f = r^2/2f. \quad (47)$$

Delay time $\tau$ of the farthest-axis ray to the nearest-axis ray is obtained by dividing the path difference by the light velocity c, $$\tau = r^2/2fc. \quad (48)$$

The width (FWHM) of the incident laser beam shooting the lens is $\Delta i$. The farthest-axis ray has a radius coordinate r=$\Delta i/2$. Substitution of r=$\Delta i/2$ to Eq. (48) gives a relation between the delay time $\tau$ and the incident beam width $\Delta i$.

$$\tau = \Delta i^2/2fc. \quad (49)$$

The effective pulse time width at the focus is a sum of the incident pulse width $\Delta t$ and the time delay $\tau$. For suppressing spatial dispersion of pulses, the farthest/nearest delay time $\Delta \tau$ should be shorter than the inherent pulse width $\Delta t$. Thus $$\Delta \tau/\Delta t \leq 1. \quad (50)$$

From Eq. (44) and Eq. (49), $$\Delta \tau/\Delta t = \Delta i^2/8fc/\Delta t = 1/4Zp = 0.25/Zp. \quad (51)$$

Inequality (50), which is a condition that the farthest/nearest delay $\Delta \tau$ should be smaller than the pulse width $\Delta t$, would determine the scope of the Z-parameter.

$$Zp \geq 0.25. \quad (52)$$

Inequalities (46) and (52) determine a preferable range of the Z-parameter Zp.

$$0.25 \leq Zp \leq 1. \tag{53}$$

However, 0.25 is not an absolute lower limit for Zp. In many cases, spatial broadening of laser pulses is allowable. Thus the lower limit is extended to 0. A preferable range of Zp is 0 to 1. ($0 < Zp \leq 1$)

Here a question may happen. Does the delay time $\Delta\tau$ between the axis-farthest ray and the axis-nearest ray act to reduce the power fluctuation by counting $\Delta\tau$ in $\Delta t$? The axis-farthest ray and the axis-nearest ray have different optical paths. Thus the uncertainty principle is not held between the axis-farthest ray and the axis-nearest ray. $\Delta\tau$ is not counted in $\Delta t$. $\Delta\tau$ has no function of reducing the power fluctuation.

The sawtoothed-sectioned lens has been described as a diffraction-type lens. Physical shape of repeating slanting edges like saw teeth induces diffraction in the lens. In stead of forming the sawtoothed surfaces with concircular slants and precipices, saw-like modulation of refractive indices n(r) can cause diffraction. Another diffraction type-lens is made by modulating spatial distribution of refractive indices and keeping the thickness constant. This is named a refractive-index-modulating lens of diffraction type. This is a novel lens. The refractive-index-modulating lens is different from the thickness-modulating (sawtoothed lens) lens. The refractive-index-modulating lens induces diffraction by the repeated variation of the refractive indices as a function of radius r. Although the new lens has no sawtoothed, edged structure, the refractive-index modulating lens should not be confused with the refractive-type lens which refracts rays by changing smoothly the thickness.

The starting function is a thickness function d(r) of a thickness-modulation refractive-type lens. The phase of a ray which passes at a radius r delays by $2\pi(n-1)d(r)/\lambda$ from the axial ray (r=0), where n is the constant refractive index of the corresponding refractive lens.

The shape-dependent delay function should be replaced by a refractive index variation function n(r) for designing a refractive index-modulation lens. The thickness is a constant which is denoted by $d_f$. The thickness variable is denoted by $n_f(r)$. The suffix "f" should not be confused with the focal length. The replacement equation is given by $$n_f(r) - 1 = (n-1)d(r)/d_f. \tag{54}$$

The $n_f(r)$ means that a refractive-index modulating lens, which is identical to the thickness-varying refractive lens, can be designed by changing the refractive index n as a function of r. In Eq. (54), d(r) and $n_f(r)$ are continual functions with regard to r. The refractive-index modulating lens determined by $n_f(r)$ is still a refractive-type lens without causing diffraction. The continual function d(r) should further be divided into sets of effective concentric slants and precipices as changes of refractive indices for producing a refractive-index modulating diffraction lens. A step of the change of (n−1)d(r) is λ. The continual $n_f(r)$ of Eq. (54) should be rewritten into a discontinual $n_f(r)$ function.

$$n_f(r) = \mod \{(n-1)d(r), \lambda\}/d_f + n_0. \tag{55}$$

Here d(r) and n are a thickness and a refractive index of the starting refractive-type lens respectively. In mod { . . . } of Eq. (55), d(r) is a r-dependent function but n is a constant. In Eq. (55), $d_f$ is the thickness (constant) and $n_o$ is a base refractive index of the object (a work piece) refractive-index modulating diffraction-type lens.

An Eq. (55) defining lens, which has flat surfaces and quasi-periodically varying refractive indices, is also a diffractive-type lens. It may sound quaint to call the refractive index modulating lens as a diffractive-type lens, because the lens makes use of only refraction. At crossing points of rays obeying Snell's law, rays having light path difference of a multiple of a wavelength meet and converge partially. At the converging points the rays refracted at different annular refractive index modulating regions have wavelength differences of just multiples of the wavelength. Rays are diffracted, obeying the refraction law. Namely diffraction and refraction accompany the refractive index modulating lens. Thus the refractive index modulating lens belongs to the category of diffraction lenses.

This is a kind of diffractive lenses which continuously vary refractive indices by a unit amplitude of λ/d. It is not easy to produce such a refractive index continually modulating type lens. Thus another diffractive lens is made by quantizing the refractive index into g steps which are defined by dividing the unit amplitude λ/d by g. A g-step quantized refractive index modulating function $n_g(r)$ is, $$n_g(r) = (\lambda/g d_f) int[g \mod \{(n-1)d(r)/\lambda, 1\}] + n_0. \tag{56}$$

The division number g is an integer. It is convenient to determine g as an exponent of 2 ($g = 2^b$). For example, when g=16 (b=4), $$n_{16}(r) = (\lambda/16 d_f) int[16 \mod \{(n-1)d(r)/\lambda, 1\}] + n_0. \tag{57}$$

In the case of g=8 (b=3), the index modulating function is $$n_8(r) = (\lambda/8 d_f) int[8 \mod \{(n-1)d(r)/\lambda, 1\}] + n_0. \tag{58}$$

A 4 step index modulation function $n_4(r)$ is $$n_4(r) = (\lambda/4 d_f) int[4 \mod \{(n-1)d(r)/\lambda, 1\}] + n_0. \tag{59}$$

In the simplest case of g=2 (b=1), a binary index modulating function $n_2(r)$ is $$n_2(r) = (\lambda/2 d_f) int[2 \mod \{(n-1)d(r)/\lambda, 1\}] + n_0. \tag{60}$$

A transparency distribution lens modulating the transparency belongs to the category of diffractive type lenses. A 2-step transparency distributing lens is defined by a transparency modulating function $T_g(r)$ $$T_g(r) = T_1 int[2 \mod \{(n-1)d(r)/\lambda, 1\}] + T_0. \tag{61}$$

The present invention succeeds in prolonging the focal depth by utilizing laser beams composed of ultrashort pulses and a diffractive type lens and increasing the range of focal length fluctuation. The present invention can be realized by making use of all kinds of diffractive type lenses. The present invention is applicable to a Fresnel lens utilizing partially refraction beside diffraction and a thickness modulating lens having microslants and microprecpices produced by quantizing the slants of the Fresnel lenses. Furthermore, a refractive index modulating lens is also applicable to the present invention. In any case, the present invention deepens the focal depth by exploiting ultrashort pulses and a diffractive lens, inducing focal point fluctuation and adding the focal point fluctuation to the focal depth. Higher order diffractive Fresnel lenses are, in particular, more effective in increasing the focal depth longer than lower order ones. A hybrid lens composed of different kinds of diffractive lenses is applicable to the present invention. For example, a hybrid lens having a Fresnel lens and a refractive index modulating lens, which are stuck together, can lengthen the focal depth. It is allowable to combine two diffractive lenses of the same kind in the axial direction in the present invention. A radial hybrid lens having a first order Fresnel lens part within a boundary radius and a second order Fresnel lens part beyond the boundary radius, or vice versa, is applicable to the present invention. Such radially different diffraction order lenses are applicable to quantized step lenses and refractive index modulation lenses in realizing the present invention. All of the diffractive lenses are useful for practicing the present invention. This invention is a useful invention.

In a laser processing apparatus for boring holes in an object (a work piece), if the focal depth is shallow, accuracy in the distance between the lens and the object (a work piece) is rigorously required. The shallow focal depth prevents the laser processing apparatus from boring deep holes. When the bored hole is shallow, a diameter of the hole fluctuates in the direction of depth. The present invention substantially lengthens the focal depth by making use of ultrashort pulses and diffractive lenses and maintaining the Z-parameter ($Zp=2fc\Delta t/\Delta i^2$) to be less than 1 ($Zp=2fc\Delta t/\Delta i^2 \leq 1$)

The present invention, which lengthens the focal depth, succeeds in lowering the accuracy required of the distance between the lens and the object (a work piece). The present invention enables a pulse laser to bore deep holes with a constant diameter in the depth direction.

BRIEF DESCRIPTION OF THE DRAWINGS

FIG. 2 right figure shows light power density by black tones. The length of the part having higher density is the focal length.

FIG. 4 (right) is beam loci at a refractive lens which produces no extra increase of a focal depth in spite of the definite wavelength width. FIG. 4 (right) is beam loci at a diffractive lens which yields extra increase of a focal depth induced by the definite wavelength width of the ultrashort (femtosecond) pulses.

DETAILED DESCRIPTION OF THE PREFERRED EMBODIMENTS

Figure 7:
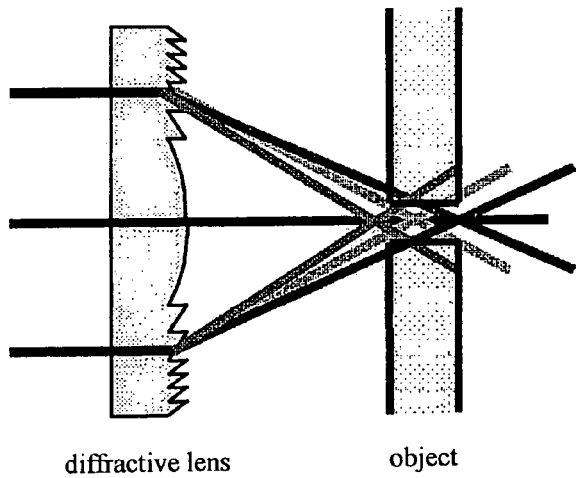
FIG. 7 is a sectional view of a diffraction lens, rays and an object (a work piece) for showing that, when the apparatus having the ultrashort pulse laser and the diffractive lens bores a hole on an opaque object (a work piece), beam shielding at hole edges presents the laser beam from reaching the inner space and from producing a constant-diameter hole.

In the boring processing of the present invention, preferable objects (work pieces) should be transparent to the laser light. Opaque materials are unsuitable for the boring processing. FIG. 7 shows a diffraction-type lens, a set of laser pulse rays with different wavelengths, and an object (a work piece) which is irradiated by the set of multiwavelength rays converged by a diffraction-type lens. If the object (a work piece) is transparent, outer rays can penetrate the object (a work piece). The set of the incident rays makes a cylindrical envelope. The set of the multiwavelength rays produces a constant-radius cylindrical hole through the object (a work piece). If the object (a work piece) is opaque, outer rays, which have shorter wavelengths and longer focal lengths, are shielded by the outer wall of the object (a work piece). Inner rays, which have longer wavelengths and shorter focal lengths, bore a hole on the front of the object (a work piece). After the front parts of the object (a work piece) are eliminated, outer rays can attain inner space of the bored hole. Namely the formation of the hole starts from the front and ends at the back of the object (a work piece). This invention enlarges the focal depth but does not enlarge laser power. The opaque wall rejects the outer rays at the beginning. Thus the hole bored in the opaque object (a work piece) by the present invention is not a constant-radius cylindrical hole but a decreasing-radius conical hole. It is desirable that the object (a work piece) is a transparent one for making the best use of the enlarged focal length of the present invention.

This invention enables ultrashort pulse lasers to enlarge effective focal depths in processing transparent objects (work pieces). Prolonged foal depths allow the ultrashort pulse laser to apply adiabatic, microscopic processings to resins, glass, sapphire, transparent semiconductors, and so on.

EMBODIMENT 1

Laser FWHM Pulse width: $\Delta t=120$ fs ($1.2 \times 10^{-13}$ s)
Incident beam FWHM diameter: $\Delta i=4.7$ mm ($w_0=4.0$ mm)
Lens Refractive Lens and Diffractive Lens
Focal Length: $f_0=100$ mm
Z-parameter: $2f_0 c\Delta t/\Delta i^2=0.32$ The Z-parameter of 0.32 is between 0.25 and 1 (0.25<0.32<1), which satisfies the aforementioned requirement between $0.25 \leq Zp \leq 1$.

Figure 1:
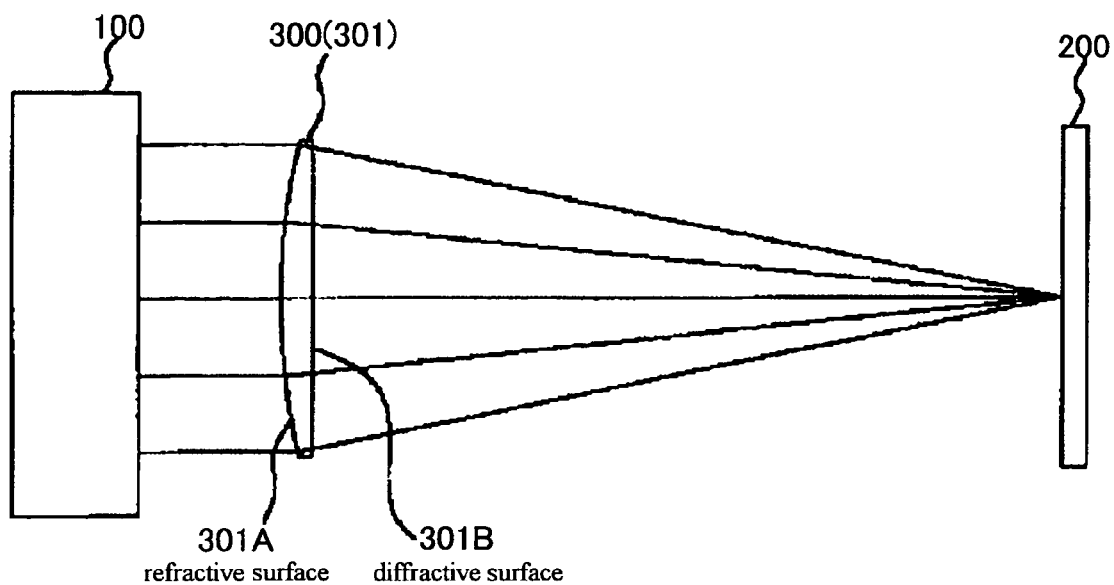
FIG. 1 is an explanatory figure for showing a method of correcting color aberration induced in an ultrashort pulse laser beam proposed by Japanese Patent Laying Open No. 2003-305585. The color aberration is corrected by a special lens having a refractive front surface and a diffractive rear surface.
Figure 2:
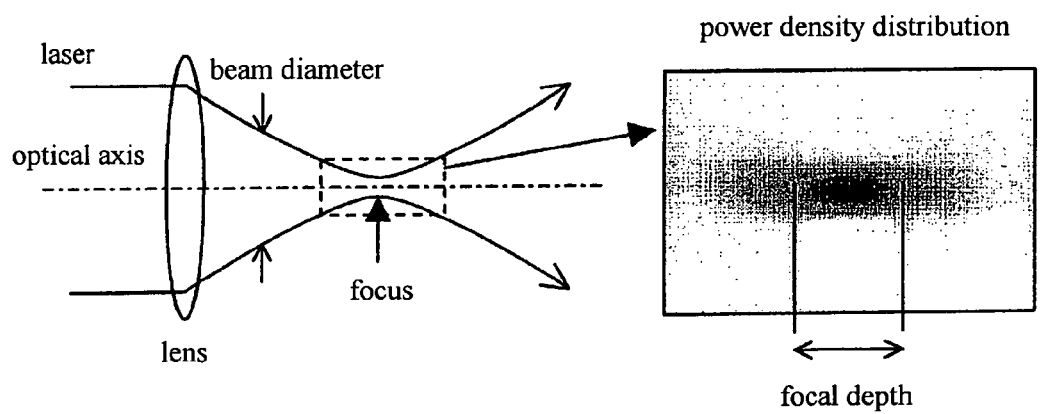
FIG. 2 is an explanatory figure of a laser beam and a lens for showing occurrence of a beamwaist, which has the maximum beam density and the smallest diameter at a focal point of the lens. The beam again widens after the beamwaist. The length enclosed by a dotted line is a definition of the focal depth (FIG. 2 left figure).
Figure 3:
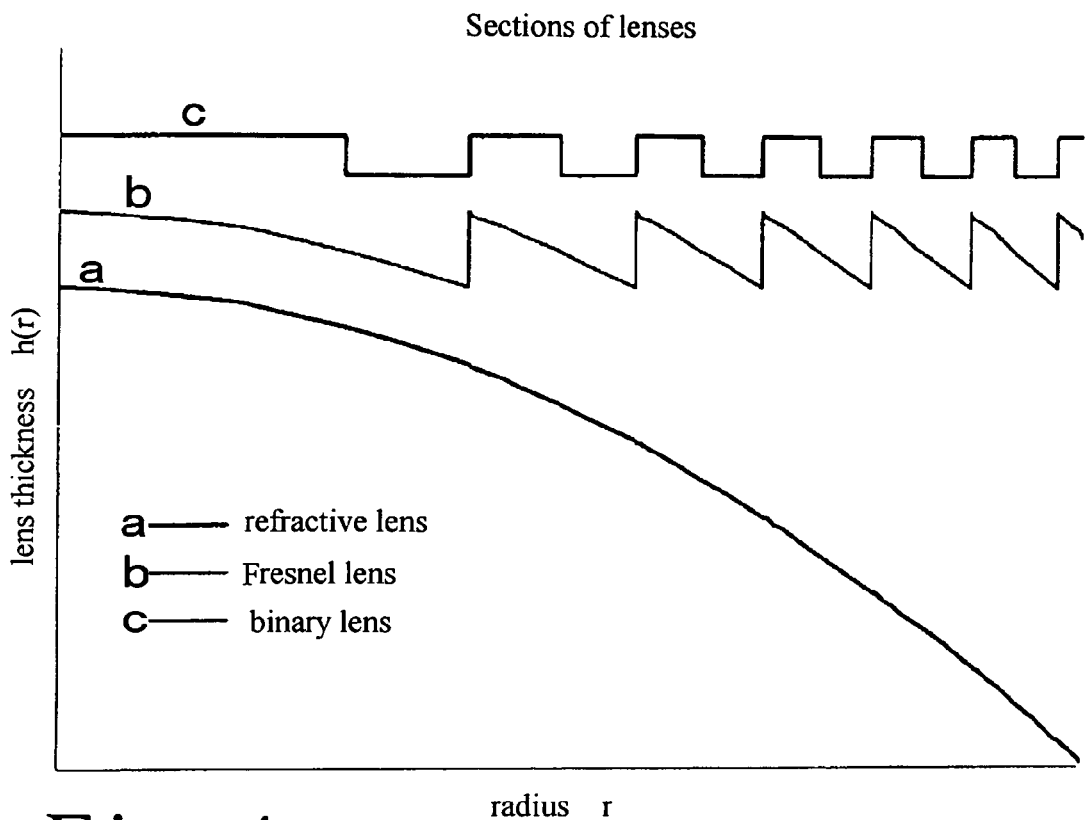
FIG. 3 is a graph of showing the relations between heights h(r) and radius coordinates (r) of a continual surface of a refractive lens (a), a saw-like zigzag surface of a Fresnel lens (b) which is made by cutting the continual surface of the refractive lens in turn into concentric circular rings having a definite height of $\lambda/(n-1)$, and a binary surface of a binary lens which is produced by allocating the parts of over half height with 1-height and the other parts of under-half height with 0-height.
Figure 4:
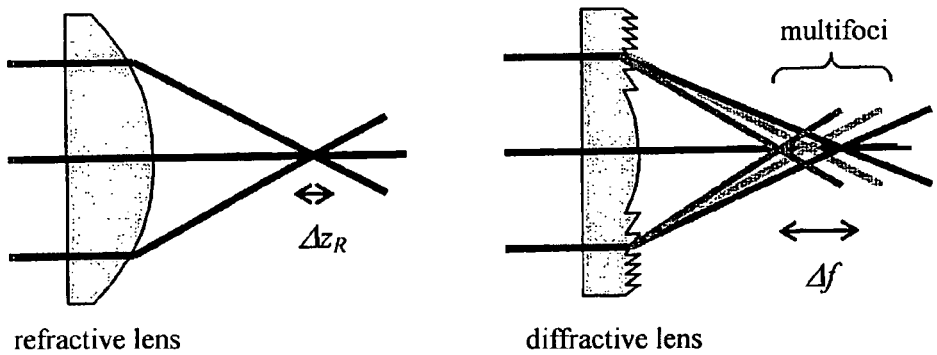
FIG. 4 is explanatory figures for showing focus multiplication of a diffraction lens for ultrashort pulses, which generates a definite wavelength width.
Figure 5:
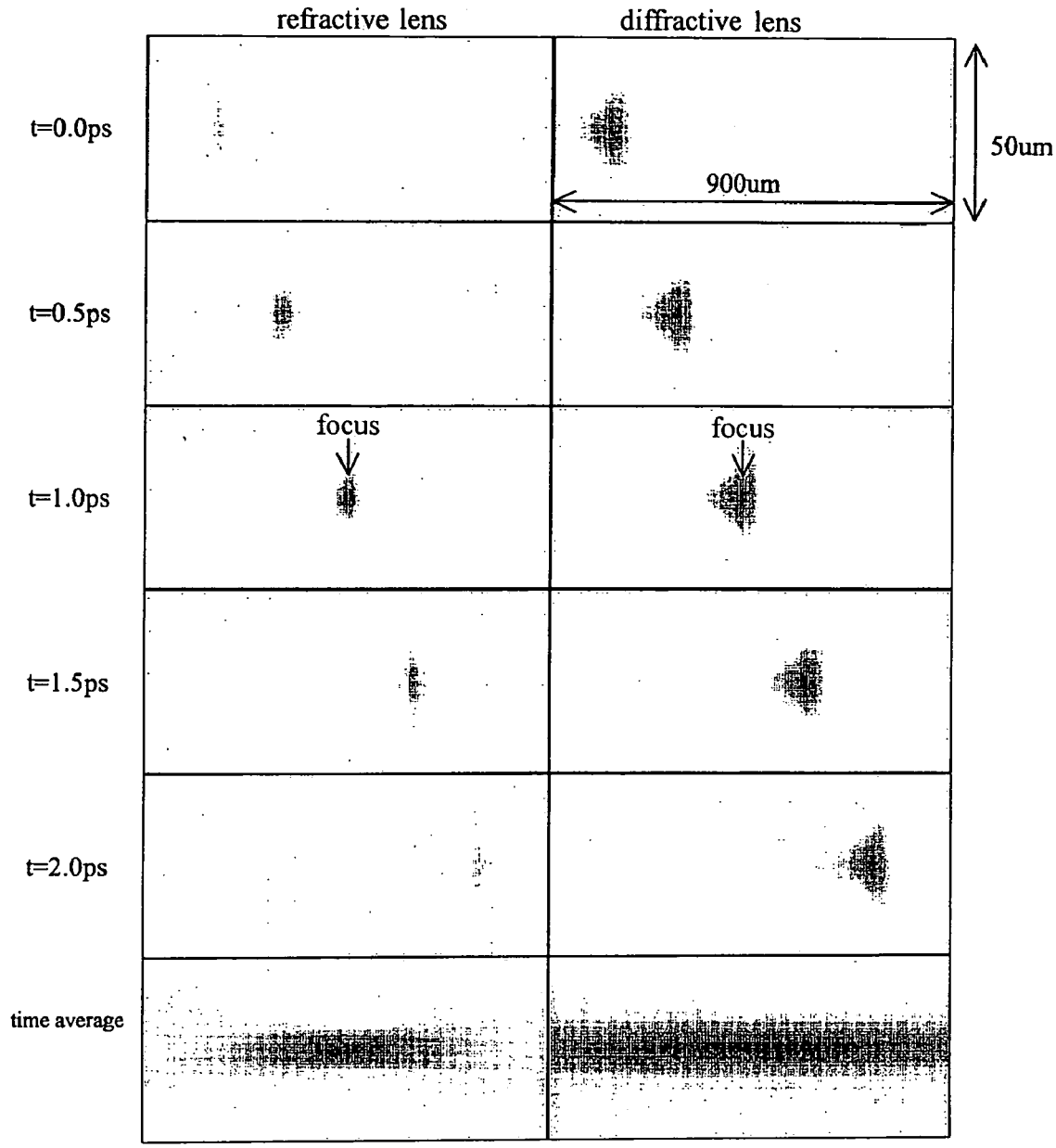
FIG. 5 is time-dependent changes of pulse laser wave packets converged by a refractive lens and a diffractive lens in the vicinity of the focus. The diffractive lens broadens the converging range and prolongs the focal depth.

The convergence properties of a refraction lens and a diffraction lens have been calculated on the abovecited conditions. FIG. 5 shows the results of calculations of power densities converged by the refraction lens and the diffraction lens. Left column figures of FIG. 5 demonstrate time-dependent spatial distributions of power density by the refractive lens. Right column figures of FIG. 5 show time-dependent spatial distributions of power density converged by the diffractive lens. The abscissa denotes distances. Individual figures have a length of 900 μm in the horizontal direction and a width in the vertical direction. Definition of t will be described later. Thus FIG. 5 demonstrates the time-dependent changes of power densities in the pre-focus 450 μm range and the post-focus 450 μm range of converging pulses by the refraction and diffraction lenses.

Since the light velocity is $3 \times 10^8$ m/s, it takes light 3 ps to pass the 900 μm length, which is a full span in FIG. 5. The instance at which a pulse departs from the laser is not t=0. The moment at which the pulse attains the focus is designated to be t=1.0 ps. FIG. 5 denotes time-dependent variations in ±1.0 ps before and after t=1.0 ps (focus time).

First line sets show the power densities at t=0.0 ps. Second line sets denote the power density at t=0.5 ps. Third line sets show the power densities at t=1.0 ps, at which wave packets exist in the vicinity of the focus. Clear power densities appear, since the wave packet coincides with the focus. Fourth line sets show the power densities at t=1.5 ps. Fifth line sets denote the power densities at t=2.0 ps. Sixth line sets show time-averaged spatial distributions of the power densities.

In both cases of the refractive-type lens and the diffractive-type lens, the wavepackets move from the left to the right at the light velocity c. Wavepackets (left column) which have passed the refractive lens are obscure. The wavepackets are faint and dispersed in the directions vertical to the axis at t=0.0 ps, 0.5 ps, 1.5 ps and 2.0 ps. The wavepacket at t=1.0 ps is clear and converged in the vertical direction, since the wavepacket is just on the focus $f_0$.

Except the focus wavepacket at f0, the 0.5 ps wavepacket is clearer than the 0.0 ps wavepacket. It is because the convergence effect of the lens at t=0.5 ps is stronger than that at t=0.1 ps. The 2.0 ps wavepacket is obscurer than the 1.5 ps wavepacket. It is because the once-converged wavepacket at t=2.0 ps expands again wider than that at t=1.5 ps.

The diffraction-type lens is entirely different from the refractive-type lens in the time-dependent change of wavepackets. At t=0.0 ps, the wavepacket stays at a point preceding the focus by 300 μm (first line). In spited of non-focal point, the t=0.0 ps wavepacket, which is partially converged, makes a cloud. At t=0.5 ps, the wavepacket passes at a point preceding the focus by 150 μm. The t=0.5 ps wavepacket forms a definite cloud (second line). At t=1.0 ps, the wavepacket passes at the focus. The t=1.0 ps wavepacket forms a definite cloud (third line). But the convergency is poorer than the refraction lens (third line of left column) at t=1.0 ps. The t=1.5 ps wavepacket passes a point following the focus by 150 μm, keeping enough density. At t=2.0 ps rays still form a wavepacket (fifth line of right column).

When parallel rays of a laser beam are converged by the diffraction lens, the diffracted rays form wavepackets of definite sizes between t=0.0 ps and t=2.0 ps in addition to the focal point at t=1.0 ps. The wavepacket maintains nearly a constant power density between t=0.0 ps and t=2.0 ps. This means poor convergency of the diffraction lens. Poor convergency is a weak point in the diffraction lens. The present invention converts the drawback into an advantage. The fact that diffracted rays form wavepackets with enough power density before and after the focus teaches us the prefocus rays and postfocus rays have enough power for laser processing.

The focal depth of the diffraction lens is prolonged to about 3.8 times as long as the focal depth of the refractive lens (1200 μm/320 μm). The diffractive lens has a function of prolong the focal depth.

The beam diameter (waist) at the focus (t=1.0 ps) of the diffractive lens is 1.54 times as big as that of the refractive lens. This means the inferiority of diffractive lenses in convergency to the refractive lens.

In the above example, the sizes of beamwaists, which are sections at foci, are different in the refractive lens (FIG. 5 left column) and the diffractive lens (FIG. 5 right column). The waist size difference should be taken into account for estimating the increase of the focal depth in the diffractive lens. Then the rate of the focal depths of the diffractive lens to the refractive lens is $3.8/1.54^2=1.6$ on the condition of equalizing the beamwaists. The focal depth of the diffractive lens is 1.6 times as large as that of the refractive lens under the condition of the same beamwaists. Dispersion of wavelengths produces many continual focal points aligning on the beam axis in the diffraction lens. The formation of many continual foci can be called "multifoci".

Figure 6:
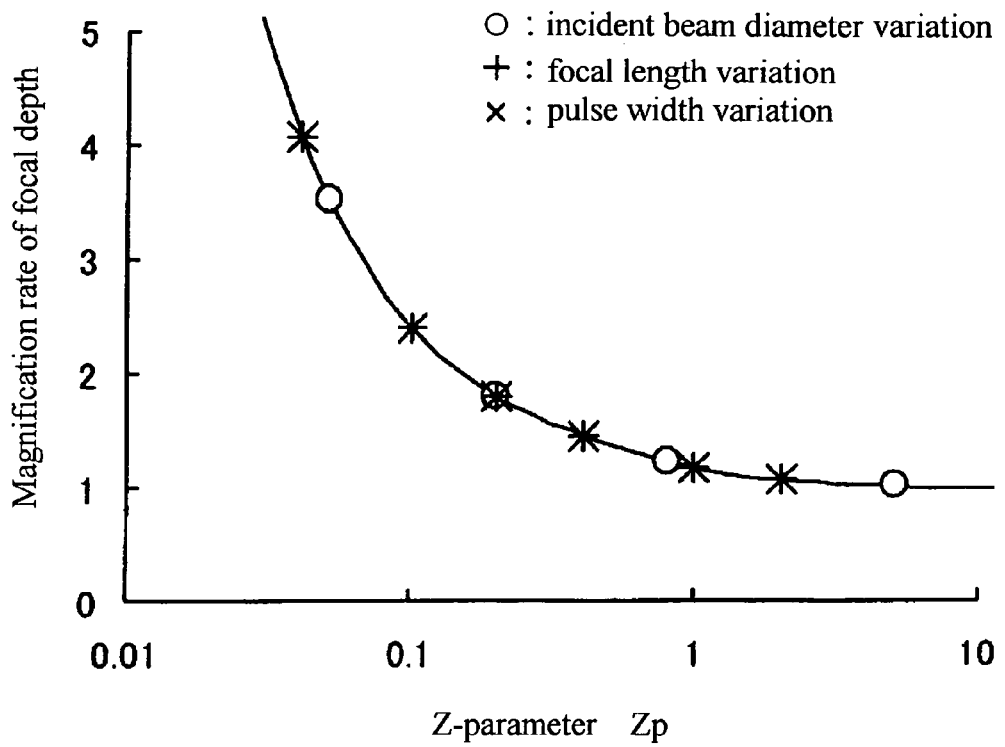
FIG. 6 is a graph for showing the relation between the Z-parameter and the focal depth magnification rate. The abscissa is the Z-parameter ($2fc\Delta t/\Delta i^2$). The ordinate is the focal depth magnification rate.

FIG. 6 is a graph showing the relation between the Z-parameter and the focal depth multiplication rate on the condition of equalizing the beamwaist to the beamwaist of the refractive lens convergence. The Z-parameters and the focal depth multiplication rate are calculated for a variety of incident beam sizes, focal lengths, and pulse widths deviating up and down from the values of the above example. Results are plotted on the same graph of FIG. 6. Blank rounds (○) shows results of a calculation which varies the incident beam diameter FWHM Δi. Crosses (+) denotes results of another calculation which changes the focal length f. (×) shows results of another calculation which varies the pulse width FWHM Δt.

Focal depth and Z-parameter changes for variations of the three parameters Δi, f and Δt lie on a common curve in FIG. 6. This fact means that the Z-parameter is a good parameter for describing the behavior of the focal depth changes. The focal depth multiplication rate increases as the Z-parameter falls. When $Z_p \leq 1$, the focal depth multiplication rate is larger than 1.

When $0.25 \leq Z_p \leq 1$, the focal depth multiplication rate attains 1.7 in FIG. 6. If the requirement $0.25 \leq Z_p$ is abandoned, the range of Zp is extended to $0 \leq Z_p \leq 0.25$. The Zp within $0 \leq Z_p \leq 0.25$ gives a further bigger focal depth multiplication. Zp=0.03 raises the focal depth up to 4 times as long as the inherent focal length of the refractive lens convergence. The present invention is based upon an excellent idea which makes the best use of the focal length dispersion of diffractive lenses and wavelength dispersion of ultrashort pulses, which are inherent defects of diffractive lenses and ultrashort pulses, for lengthening the focal depth.

The present invention succeeds in lengthening the focal depth in the ultrashort pulse laser processing by adopting a diffraction lens having a Z-parameter less than 1 ($Z_p \leq 1$), inducing wavelength dispersion, varying the focal length and making many continual foci aligning on the beam axis. The deep focal depth is desirable for boring a cylindrical (diameter-constant) deep hole. The deep focal depth is effective for processing thick objects (work pieces). When changes of surrounding conditions displace the focal point, the long focal depth prevents the laser power from fluctuating in the object (a work piece) and allows the pulse laser to realize homogeneous and stable processing.

What we claim is:

1. A laser processing method comprising the steps of:
emitting ultrashort light pulses having a wavelength λ, an FWHM diameter Δi and an FWHM pulse width Δt from a pulse laser, wherein the FWHM diameter Δi is a full width of a peak of laser power distribution at a height of half of the maximum and the FWHM width Δt is a full width of a peak of pulse width distribution at a height of half of the maximum; and
converging the ultrashort light pulses by a diffractive lens having a focal length f to a work piece placed at the focal point of the diffractive lens,
wherein the focal length f, the FWHM diameter Δi and the FWHM pulse width Δt are adjusted so that a Z-parameter defined by $Z_p = 2fc\Delta t/\Delta i^2$ satisfies an inequality $Z_p = 2fc\Delta t/\Delta i^2 \leq 1$, where c is the light velocity in vacuum.

2. The laser processing method according to claim 1, wherein the FWHM pulse width Δt is less than 20 ps.

3. The laser processing method according to claim 1, wherein the diffractive lens is a thickness modulating lens having thickness distribution defined by a function $h_g(r)$:

$$h_g(r) = \frac{\lambda}{g(n_f - 1)} \cdot \text{int}\left[g \cdot \text{mod}\left\{\frac{(n-1)d(r)}{\lambda}, 1\right\}\right] + h_0,$$

where g is a division number, d(r) is a thickness function of a reference refractive lens having a focal length f, n is a refractive index of the reference refractive lens, $n_f$ is a refractive index of the diffractive lens, $h_0$ is a base thickness and r is a radial coordinate.

4. The laser processing method according to claim 1, wherein the diffractive lens is a thickness modulating lens having thickness distribution defined by a function $h_2(r)$:

$$h_2(r) = \frac{\lambda}{2(n_f - 1)} \cdot \text{int}\left[2\text{mod}\left\{\frac{(n-1)d(r)}{\lambda}, 1\right\}\right] + h_0,$$

where a division number is 2, d(r) is a thickness function of a reference refractive lens having a focal length f, n is a refractive index of the reference refractive lens, $n_f$ is a refractive index of the diffractive lens, $h_0$ is a base thickness and r is a radial coordinate.

5. The laser processing method according to claim 1, wherein the diffractive lens is a refractive index modulating lens having refractive distribution defined by a function $n_g(r)$:

$$n_g(r) = \frac{\lambda}{g \cdot d_f} \cdot \text{int}\left[g \cdot \text{mod}\left\{\frac{(n-1)d(r)}{\lambda}, 1\right\}\right] + n_0,$$

where g is a division number, d(r) is a thickness function of a reference refractive lens having a focal length f, n is a refractive index of the reference refractive lens, $d_f$ is a thickness of the diffractive lens, $n_0$ is a base refractive index and r is a radial coordinate.

6. The laser processing method according to claim 1, wherein the diffractive lens is a refractive index modulating lens having refractive distribution defined by a function $n_2(r)$:

$$n_2(r) = \frac{\lambda}{2d_f} \cdot \text{int}\left[2\text{mod}\left\{\frac{(n-1)d(r)}{\lambda}, 1\right\}\right] + n_0,$$

where a division number is 2, d(r) is a thickness function of a reference refractive lens having a focal length f, n is a refractive index of the reference refractive lens, $d_f$ is a thickness of the diffractive lens, $n_0$ is a base refractive index and r is a radial coordinate.

7. The laser processing method according to claim 1, wherein the diffractive lens is a thickness modulating lens having thickness distribution defined by a function $h_g(r)$:

$$h_g(r) = \frac{1}{(n_f - 1)}\text{mod}\{(n-1)d(r), \lambda\} + h_0,$$

where g is a division number, d(r) is a thickness function of a reference refractive lens having a focal length f, n is a refractive index of the reference refractive lens, $n_f$ is a refractive index of the diffractive lens, $h_0$ is a base thickness and r is a radial coordinate.

8. The laser processing method according to claim 1, wherein the Z parameter $Z_p$ satisfies an inequality of $0.25 \leq Z_p \leq 1$.

9. The laser processing method according to claim 1, wherein the work piece is a material transparent to the laser light having the wavelength λ.

10. The laser processing method according to claim 9, wherein the transparent material is a resin material.

11. A laser processing apparatus comprising:
a pulse laser for emitting ultrashort light pulses having a wavelength λ, an FWHM diameter Δi and an FWHM pulse width Δt, wherein the FWHM diameter Δi is a full width of a peak of laser power distribution at a height of half of the maximum and the FWHM width Δt is a full width of a peak of pulse width distribution at a height of half of the maximum, and
a diffractive lens having a focal length f for converging the ultrashort light pulses to a work piece placed at the focal point of the diffractive lens,
wherein the focal length f, the FWHM diameter Δi and the FWHM pulse width Δt are adjusted so that a Z-parameter defined by $Z_p = 2fc\Delta t/\Delta i^2$ satisfies an inequality $Z_p = 2fc\Delta t/\Delta i^2 \leq 1$, where c is the light velocity in vacuum.

12. The laser processing apparatus according to claim 11, wherein the diffractive lens is a thickness modulating lens having thickness distribution defined by a function $h_g(r)$:

$$h_g(r) = \frac{\lambda}{g(n_f - 1)} \cdot \text{int}\left[g \cdot \text{mod}\left\{\frac{(n-1)d(r)}{\lambda}, 1\right\}\right] + h_0,$$

where g is a division number, d(r) is a thickness function of a reference refractive lens having a focal length f, n is a refractive index of the reference refractive lens, $n_f$ is a refractive index of the diffractive lens, $h_0$ is a base thickness and r is a radial coordinate.

13. The laser processing apparatus according to claim 11, wherein the diffractive lens is a thickness modulating lens having thickness distribution defined by a function $h_2(r)$:

$$h_g(r) = \frac{\lambda}{2(n_f - 1)} \cdot \text{int}\left[2\text{mod}\left\{\frac{(n-1)d(r)}{\lambda}, 1\right\}\right] + h_0,$$

where a division number is 2, d(r) is a thickness function of a reference refractive lens having a focal length f, n is a refractive index of the reference refractive lens, $n_f$ is a refractive index of the diffractive lens, $h_0$ is a base thickness and r is a radial coordinate.

14. The laser processing apparatus according to claim 11, wherein the diffractive lens is a refractive index modulating lens having refractive distribution defined by a function $n_g(r)$:

$$n_g(r) = \frac{\lambda}{g \cdot d_f} \cdot \text{int}\left[g \cdot \text{mod}\left\{\frac{(n-1)d(r)}{\lambda}, 1\right\}\right] + n_0,$$

where g is a division number, d(r) is a thickness function of a reference refractive lens having a focal length f, n is a refractive index of the reference refractive lens, $d_f$ is a thickness of the diffractive lens, $n_0$ is a base refractive index and r is a radial coordinate.

15. The laser processing apparatus according to claim 11, wherein the diffractive lens is a refractive index modulating lens having refractive distribution defined by a function $n_2(r)$:

$$n_2(r) = \frac{\lambda}{2d_f} \cdot \text{int}\left[2\text{mod}\left\{\frac{(n-1)d(r)}{\lambda}, 1\right\}\right] + n_0,$$

where the division number is 2, $d(r)$ is a thickness function of a reference refractive lens having a focal length f, n is a refractive index of the reference refractive lens, $d_f$ is a thickness of the diffractive lens, $n_0$ is a base refractive index and r is a radial coordinate.

16. The laser processing method according to claim 11, wherein the diffractive lens is a thickness modulating lens having thickness distribution defined by a function $h_g(r)$:

$$h_g(r) = \frac{1}{(n_f - 1)} \text{mod}\{(n-1)d(r), \lambda\} + h_0,$$

where g is a division number $d(r)$ is a thickness function of a reference refractive lens having a focal length f, n is a refractive index of the reference refractive lens, $n_f$ is a refractive index of the diffractive lens, $h_0$ is a base thickness and r is a radial coordinate.

17. A laser processing method comprising the steps of:

emitting light pulses having a wavelength $\lambda$, an FWHM diameter $\Delta i$ and an FWHM pulse width $\Delta t$ from a pulse laser, wherein the FWHM diameter $\Delta i$ is a full width of a peak of laser power distribution at a height of half of the maximum and the FWHM width $\Delta t$ is a full width of a peak of pulse width distribution at a height of half of the maximum;

converging the light pulses by a diffractive lens having a focal length f to a work piece placed at or near the focal point of the diffractive lens; and adjusting at least one of the focal length f, the FWHM diameter $\Delta i$ and the FWHM pulse width $\Delta t$, so that a Z-parameter defined by $Z_p = 2fc\Delta t/\Delta i^2$ satisfies an inequality $Z_p = 2fc\Delta t/\Delta i^2 \leq 1$, where c is the light velocity in vacuum.

* * * * *